(No Model.)

F. PETTGE & L. METZGER.
BUNG.

No. 413,681. Patented Oct. 29, 1889.

Witnesses:
A. Jonghmans.
W. H. Wagner.

Inventors:
F. Pettge &
L. Metzger
by their attorneys
Roeder & Briesen

UNITED STATES PATENT OFFICE.

FRIEDRICH PETTGE AND LUDWIG METZGER, OF DESSAU, GERMANY.

BUNG.

SPECIFICATION forming part of Letters Patent No. 413,681, dated October 29, 1889.

Application filed February 27, 1889. Serial No. 301,393. (No model.)

*To all whom it may concern:*

Be it known that we, FRIEDRICH PETTGE and LUDWIG METZGER, both subjects of the Duke of Anhalt, residing at Dessau, Duchy of Anhalt, German Empire, have invented certain new and useful Improvements in Bungs, of which the following is a specification.

This invention relates to an improvement in bungs that close the discharge-opening of a barrel, cask, or other receptacle.

The invention consists in the various features of improvement more fully pointed out in the claim.

Figure 1:
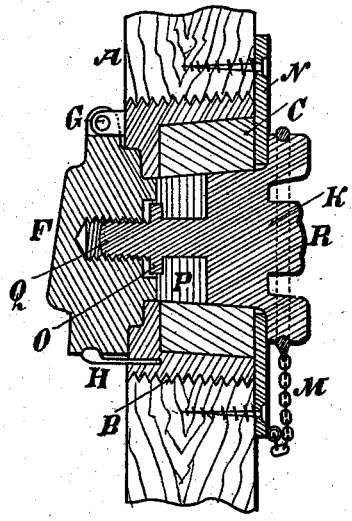
Figure 3:
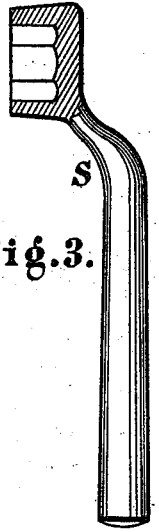
Figure 2:
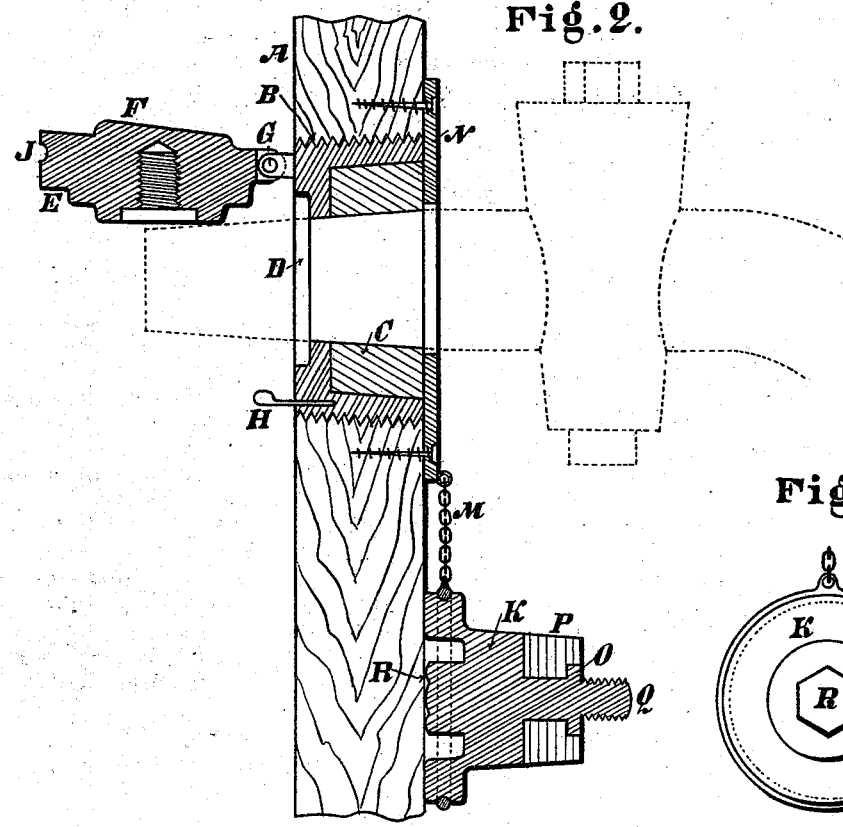
Figure 4:
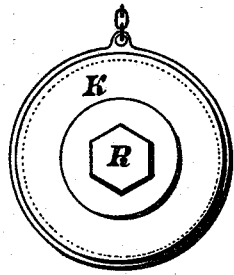

In the accompanying drawings, Figure 1 is a vertical central section of our improved bung, showing the bung-hole closed. Fig. 2 is a similar section showing the bung-hole open and the faucet in place. Fig. 3 is a side view of the key for operating the bung, and Fig. 4 is a top view of the bung.

The letter A represents the head of a barrel, cask, or other receptacle, the bung-hole of which is provided with bush B, having a lining C of wood or other yielding material. On the inner face of bush B there is a recess D, that constitutes a seat for the rim of a clack-valve F, pivoted by pin G to a projection on bush B. The body of the valve F increases in weight from top to bottom, so that it will readily fall down by its own weight as soon as the tapping-cock has been removed. In falling down the valve F engages a spring-catch H, that enters a notch J on the edge of the valve.

K is the tapering plug or bung proper, of a size to fit within lining C, and suspended by a chain M from face-plate N. The plug K is reduced in size at its inner end to form screw Q, and is provided with a rubber packing P, held in place by a collar O. The inner face of this packing comes into contact with the valve F, Fig. 1, and thus the packing can be compressed by said valve. The screw Q engages a screw-threaded socket of valve F.

In use the head R of plug K is grasped by key S, and on being revolved will draw the valve F tight against packing P, thus compressing the latter and properly closing the opening.

If the faucet is to be inserted, the plug K is unscrewed and the faucet is pushed in. Its inner end will press against the valve F and will cause a disengagement of spring-catch H. Thus the valve is free to be swung into the position shown in Fig. 2, while the faucet may be properly put in place.

What we claim is—

The combination of threaded plug K, having collar O, with elastic packing P and with suspended valve F and catch H, substantially as specified.

In testimony whereof we hereunto sign our names, in the presence of two subscribing witnesses, this 19th day of December, 1888.

FRIEDRICH PETTGE.
LUDWIG METZGER.

Witnesses:
CARL BORNGRAEBER,
ERNST SCHOLZ.